United States Patent [19]
Rebondy et al.

[11] Patent Number: 5,389,461
[45] Date of Patent: Feb. 14, 1995

[54] ELECTROCHEMICAL BATTERY WITH MOBILE ELECTRODES

[75] Inventors: Jacques Rebondy, Quaix en Chartreuse; Jean-Pierre Galves, Meylan, both of France

[73] Assignee: Thomson Tubes Electroniques, Velizy, France

[21] Appl. No.: 39,421

[22] PCT Filed: Aug. 28, 1992

[86] PCT. No.: PCT/FR92/00826
§ 371 Date: Apr. 29, 1993
§ 102(e) Date: Apr. 29, 1993

[87] PCT Pub. No.: WO93/05542
PCT Pub. Date: Mar. 18, 1993

[30] Foreign Application Priority Data
Sep. 3, 1991 [FR] France ................. 91 10865

[51] Int. Cl.⁶ .................... H01M 6/38; H01M 6/14
[52] U.S. Cl. ................... 429/113; 429/190; 429/210
[58] Field of Search ............ 429/113, 110, 48, 210, 429/190

[56] References Cited
U.S. PATENT DOCUMENTS

| | | |
|---|---|---|
| 979,153 | 12/1910 | Gugler ................. 429/113 X |
| 2,850,556 | 9/1958 | Hermitte . |
| 3,053,928 | 9/1962 | Hopkins . |
| 3,193,413 | 7/1965 | Tamminen ............ 429/110 X |
| 3,332,804 | 7/1967 | Zaromb . |
| 3,375,142 | 3/1968 | Concannon . |
| 3,635,766 | 1/1972 | Quisling . |

FOREIGN PATENT DOCUMENTS 0365504 4/1990 European Pat. Off. .

OTHER PUBLICATIONS

Patent Abstracts of Japan, vol. 13, No. 364 (E-805) (3712), Aug. 14, 1989, & JP,A, 1120771 (Shin Kobe Electric Mach Co Ltd.), May 12, 1989.

Primary Examiner—John S. Maples
Attorney, Agent, or Firm—Oblon, Spivak, McClelland, Maier & Neustadt

[57] ABSTRACT

An electrochemical battery with mobile electrodes of the so-called "reserve" type. According to one characteristic of the invention, the battery includes a holder for holding the electrodes outside the cells during a storage period of the battery, and for placing these electrodes inside the cells in order to activate the battery.

6 Claims, 1 Drawing Sheet

ELECTROCHEMICAL BATTERY WITH MOBILE ELECTRODES

BACKGROUND OF THE INVENTION

Aug. 28, 1992.

1. Field of the Invention

The invention relates to electrochemical batteries,

The invention relates to electrochemical batteries, especially electrochemical batteries of the so-called "reserve" type. It particularly relates to means for producing the activation of such batteries.

2. Description of the Related Art

Electrochemical batteries of the reserve type are batteries intended to be set in operation after a storage period whose duration is variable and may extend for example up to 15 years and more.

This type of battery is widely used in order to provide electrical energy in ballistic devices, for example shells, missiles, etc. However, these batteries are also of great interest in other fields, for example that of security devices.

Batteries of the reserve type provide electrical energy from the instant when they are activated. The activation of the battery consists in uniting the different elements which, conventionally, convert the chemical reaction into electrical energy.

Such an electrochemical battery may comprise one or more electrochemical cells, the number of these cells being a function of the voltage to be obtained. In operation, that is to say after activation, each cell comprises two electrodes of opposite polarities in contact with a quantity of liquid electrolyte.

Most often, the liquid electrolyte is held outside the cell in a storage reservoir until the instant of activation. The activation of the battery consists in releasing the electrolyte.

In the case for example of rockets or artillery shells, during the storage period, all the quantities of electrolyte necessary for all the cells are most often contained in a single storage reservoir. The activation of the battery consists in releasing the liquid electrolyte from the reservoir and in bringing it into the cell or different cells. This activation may be obtained by combining the effects of the strong acceleration and of the speed of rotation which appear at the start of the shot: the electrolyte is released for example by breaking a cap under the effect of the longitudinal acceleration, at the instant of firing; and the electrolyte is distributed in the cells, aided to this effect by the centrifugal force due to the rotation of the device on itself.

In structures having a single storage reservoir for several cells, a significant problem resides in the balancing, that is to say the most even distribution possible of the electrolyte between the various cells, while minimising communication between the cells. In fact, in the most common case when the electrodes are of the "bipolar electrode" type, any quantity of electrolyte contained in communication ducts between cells generates a self-consumption phenomenon of the battery, which decreases the capacity of the latter for supplying energy to the working load. Furthermore, the electrolyte contained in these ducts may generate a troublesome fluctuation of the voltages delivered by the battery.

This leads in practice to the adoption of various compromises in the production of these batteries, which make the structure more complex, without thereby completely eliminating the problem of self-consumption. Examples of production of such reserve electrochemical batteries which "can be activated on firing" are found in particular in U.S. No. Pat. 2,996,564 and in French Patent Applications No. 8,815,331 and 8,909,637.

It should be noted that the problem posed by the activation of the reserve batteries, in the case of rotating ammunition, is made still more difficult in the case when the battery is mounted in a missile or projectile, which can undergo low accelerations, for example a mortar shell. The case of the mortar shell is actually particularly difficult, because of its low possible acceleration on starting, and the absence of rotation.

Thus, the principles explained above for producing the release and distribution of the electrolyte in the cells are inapplicable. Other solutions are envisaged, which are technologically much more complex.

In fact, these more complex solutions do not yet appear to have been achieved industrially. Hitherto, the electrical supply in mortar rockets has been effected using turbine and alternator systems whose implementation is complex and expensive but which have the advantage of being in existence.

The present invention relates to electrochemical batteries, in particular of the reserve type. It particularly relates to means for producing the activation of such batteries, and is applicable equally well in the case of high or low accelerations, with or without centrifugal force. It makes it possible to bring about very rapid activation while avoiding the defects of self-consumption and of poor distribution of the electrolyte. Furthermore, the invention is well suited to economical industrial production, so much so that it may be applied in numerous domains other than those already cited, for example the electrical supply of security devices, such as extinguishers, beacons, etc.

SUMMARY OF THE INVENTION

According to the invention, an electrochemical battery comprising at least one cell, the cell comprising two electrodes of opposite polarities and an electrolytic space containing an electrolyte, is characterised in that it furthermore comprises means for, on the one hand, holding the electrodes outside the cell during a period of storage of the battery, and, on the other hand, for placing these electrodes in the cell in order to activate the battery.

This solution is particularly advantageous in that it allows the electrolyte to be stored in the cell itself, in the position of use, such that the act of putting the electrode in place causes the immediate operation of the battery. Furthermore, in the case of several cells, the distribution of the electrolyte in the cells is always correct, because it is carried out during the manufacture of the battery.

DESCRIPTION OF THE DRAWINGS

The invention will be better understood, and other advantages and characteristics which it exhibits will emerge better on reading the description which follows, made with reference to the attached drawings, in which.

DETAILED DESCRIPTION OF THE PREFERRED EMBODIMENTS

Figure 1:
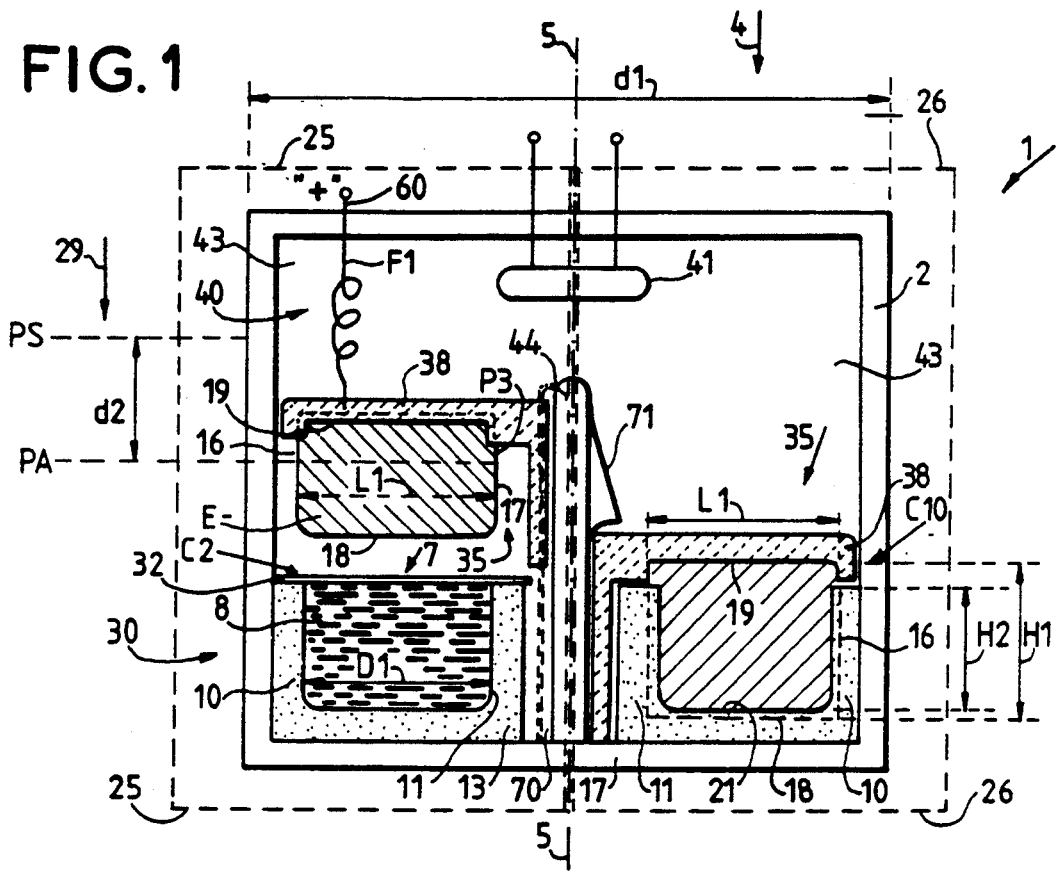
FIG. 1 shows a battery according to the invention through a sectional view parallel to one cell.

FIG. 1 diagrammatically shows, by way of non-limiting example, an electrochemical battery 1 according to the invention.

The battery 1 is of the reserve type. It comprises an enclosure 2, which, in the non-limiting example described, has a circular cross section (represented by its diameter d1), the plane of this cross section being perpendicular to that in FIG. 1. Several electrochemical cells are arranged around a longitudinal axis 5 of the enclosure, of which only two cells C2, C10 are represented in FIG. 1.

Figure 2:
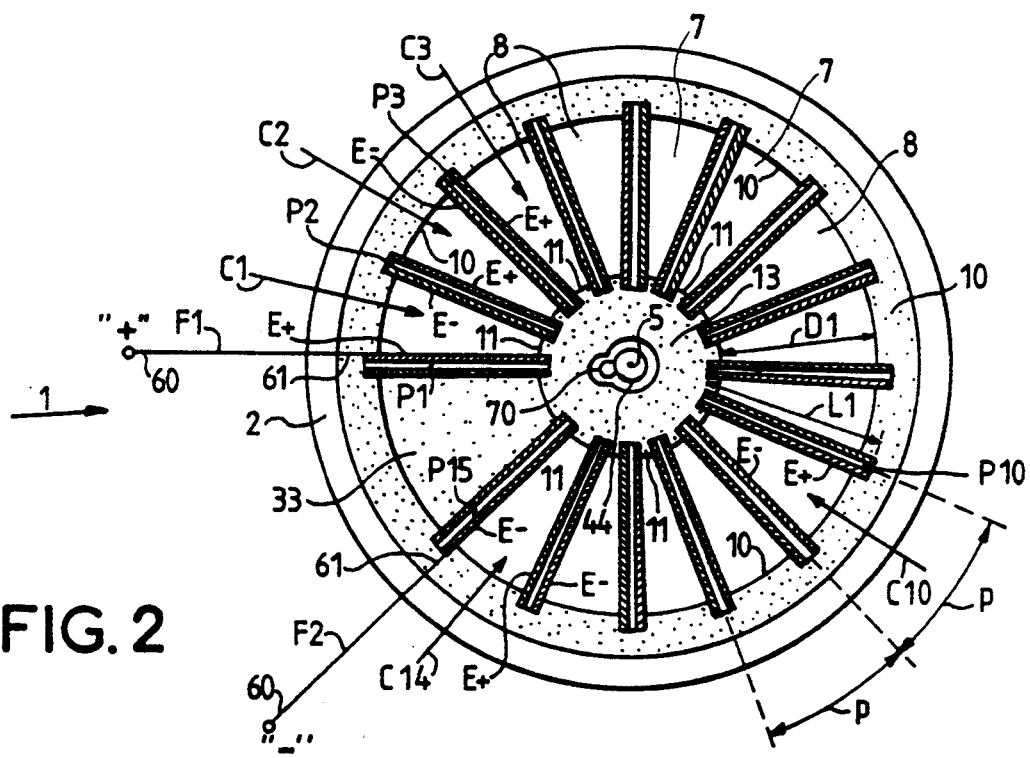
FIG. 2 is a top view of the battery of the invention showing a distribution of several cells with their electrodes.

FIG. 2 is a top view of the battery 1, which view is symbolically represented in FIG. 1 by an arrow 4, and which shows the battery 1 in cross section.

In the non-limiting example described, 14 consecutive electrochemical cells C1 to C14 are distributed around the longitudinal axis 5 with a pitch p; the longitudinal axis 5 being perpendicular to the plane of FIG. 2, it appears on the latter as a point. Obviously, in the spirit of the invention, these cells may be arranged differently and there may be a different number of them, greater or smaller, it being possible for there to be only a single cell.

Each cell C1 to C14 comprises two electrodes E, E+ of opposite polarities located on either side of a space called the "electrolytic space" 7 containing an electrolyte 8.

The electrochemical cells C1 to C14 are mounted in series and add the voltages which they produce, so that the total electromotive force is available between two outputs "+", "−", one of which is the positive polarity delivered by an electrode E+, of the first cell C1, and the other "−" is the negative polarity delivered by the electrode E− of the last cell C14.

In a manner which is per se conventional, the electrodes E−, E+ consist of bipolar plates, that is to say that they are carried by separating plates P1 to P15, on the two opposite large faces of the latter: the separating plates P1 to P15 are made of a conducting material of which one face is covered for example with lead in order to form a negative electrode E−, and the other face of which is covered for example with lead dioxide ($PbO_2$) in order to form a positive electrode E+.

Thus, for example, the third separating plate P3, which separates the second and the third electrochemical cells C2 and C3, carries on one face the negative electrode E− of the second cell C2, and carries its opposite face the electrode E+ of the third cell C3.

The separating plates P1 and P15 do not in principle need their deposition E− (for P1) and E+ (for P15), but for reasons of economy, it is simpler in practice to produce them in the same plate as the others, although the face forming E− in the case of P1 and the face forming E+ in the case of P15 do not have any electrical role.

The electrolytic space 7 is delimited in each cell C1 to C14 between the two electrodes E+, E− and between 3 insulating walls: the first called a peripheral wall 10 is on the side of the enclosure 2; the second situated opposite the first is called the central wall 11, it consists for example of a ring of insulating material 13 centred on the longitudinal axis 5; the third insulating wall being formed by the insulating bottom 21 of the cell.

In each cell C1 to C14, the peripheral and central walls 10, 11 are separated by a distance D1 called the separation distance which extends parallel to radii (not represented) of the enclosure 2.

According to one characteristic of the invention, when the battery 1 is in operation, the separating plates P1 to P15 have a length L1 parallel to the separation distance D1 and greater than the latter, so that each of the lateral edges 16, 17 of the separating plates P1 to P15 extend further and are driven into the peripheral and central insulating walls 10, 11. These lateral edges 16, 17 are thus clamped in the walls 10, 11 and protected from any contact with the electrolyte 8, in order to avoid the phenomenon of self-consumption.

Again with reference to FIG. 1, the latter represents, in particular, on the one hand, the second cell C2 in a left-hand portion of the figure situated in a box labelled 25; and it represents in particular the tenth cell C10 in a second box labelled 26.

The box 25 has the purpose of illustrating the storage position of the battery, that is to say its non-activated state, and therefore the one in which it does not function. The box 26 has the purpose of illustrating the activated position, when the battery is set in operation.

According to another characteristic of the invention, in the storage position of the battery, the electrodes E+, E− are retained outside the cells C1 to C14. This is illustrated by the box 25, in which the separating plate P3 is retained separated from the electrolytic unit 30 constituted by the various cells C1 to C14 which each contain an electrolyte 8.

The third separating plate P3 carries on its visible face a negative electrode E− intended for the second cell C2, and carries on the other face a positive electrode E+ intended for the third cell C3.

According to the invention, the activation of the battery 1 is obtained by putting in place the various electrodes E+, E− in the various cells C1 to C14. For this purpose, all the separating plates P1 to P15 are moved from a top position (shown in the box 25) to a bottom position (shown in the box 26) where they are engaged between the various cells C1 to C14 until they bear on the insulating bottom 21 of the cell, that is to say the bottom with which the electrolyte 8 is in contact.

This latter position of the separating plates P1 to P15 is illustrated in the box 26 in which it is seen that a positive electrode E+, forming the visible face of the tenth separating plate P10, is placed inside the tenth cell C10.

It can be seen, as previously indicated, that the separating plate P10 has a length L1 greater than the separation distance D1, so that its lateral edges 16 and 17 are engaged in the insulating walls 10, 11. Furthermore, the separating plates have a height H1 which is greater than the depth H2 of the electrolytic space 7, so that when they are in place, on the one hand they have a lower edge 18 which penetrates into the insulating bottom 21, and on the other hand they have an upper edge 19 (opposite the lower edge 18) which remains outside the electrolytic space 7.

In the storage period, each cell C1 to C14 contains the quantity of electrolyte necessary for its operation, and the electrodes E+, E− are retained separated from the electrolytic unit.

The activation consists in placing the electrodes E+, E− in the electrolytic unit, in contact with the electrolyte. This is achieved by a relative motion between the electrolytic unit and the separating plates P1 P15, and as described above, the dimensions of the latter are such that, as they are driven into a cell, they penetrate the peripheral and central walls 10, 11 in which their lateral edges 16, 17 are embedded and isolated from the electrolyte, in the same way as their lower edge 18 is driven into the bottom 21; this arrangement makes it possible to avoid the phenomenon of self-consumption which occurs when the segment of a bipolar plate is bathed in the electrolyte.

Of course, the electrically insulating material from which the walls 10, 11 and the bottom 21 are made must have a structure adapted to allow it to be penetrated by the edges of the plates without disintegrating, and to maintain a seal around these edges. Materials having the requisite qualities are for example elastomers, or gels of the silicone type.

The electrolyte may be in liquid form or alternatively and preferably in solid form, that is to say in the form of a gel.

Such a solid electrolyte, henceforth in the description termed an "electrolytic gel", may be obtained in a manner which is per se simple, by adding to the electrolyte gelling agents for example based on colloidal silica or the like.

In the non-limiting example described where the electrodes E+, E− are made of lead and of lead oxide, the electrolytic gel may for example be based on colloidal silica, together with fluoroboric acid and diethylene glycol.

Whatever the nature of the electrolyte 7, it is contained in the cells C1 to C14 for the storage period, in the position and in the form of its use, that is to say that it is immediately usable with perfect distribution in the cells. There is therefore no problem of balancing the quantities of electrolyte between cells, as in the prior art, because the driving in of the separating plates P1 to P15 only has the effect of separating the respective electrolyte parts of two consecutive cells C1 to C14 from each other. In fact, the insulating walls 10, 11 and the bottom 21 as well as the electrolyte 8 may extend continuously: the cells C1 to C14 are actually created by the driving in of the separating plates P1 to P15 or bipolar plates, which driving in has the consequence of delimiting the electrolyte part allocated to each cell, and of placing the electrodes E−, E+ on either side of this electrolyte part. Of course, it is suitable for this purpose that, when they are being driven into the cells C1 to C14, the separating plates P1 to P15 are held at defined positions around the longitudinal axis 5, with predetermined separations between them which correspond to the pitch p of the cells C1 to C14.

For better preservation of the electrolytic gel, for example against drying-out, the zone containing the electrolyte, that is to say the succession of electrolytic spaces 7, may be covered with a leaktight film or cap 32, for example made of a heat-welded plastic. The cap 32 furthermore produces mechanical holding of the electrolytic gel.

In the case of a liquid electrolyte, based on $HBF_4$ for example, the cap 32 is necessary for keeping the electrolyte in its housing which is constituted by the succession of electrolytic spaces 8.

Of course, the lid 32 is perforated by the lower edges 18 of the separating plates P1 to P15, when the latter are driven into the cells. With a view to facilitating the penetration of the separating plates P1 to P15 into the walls 10, 11, and the bottom 21, and possibly the cap 32, the inner edge 18 and possibly the edges 16, 17 of these plates may be made into cutting edges, for example by giving them a triangular shape (not represented).

The motion which is to lead to the electrodes E+, E− being driven into the cells C1 to C14 may be obtained by moving the separating plates P1 to P15 and/or by moving the electrolytic unit 30. For practical and mechanical reasons, it may be preferable to fix the latter in the enclosure 2, and to make the separating plates P1 to P15 mobile, as in the non-limiting example represented in FIG. 1.

It is furthermore preferable to guide the plates P1 to P15, in particular in the case of the example represented, where the cells C1 to C14 follow each other around a circle (see FIG. 2), and where the space between the first and last cells C1, C14 is formed by an isolating space 33 without electrolyte.

In the non-limiting example described, the separating plates P1 to P15 are moulded onto a plastic article 38 which is common to all these plates, so that all these plates are retained in the article 38 by their upper edge 19.

The plastic article 38 extends above the succession of cells P1 to P3, and it carries the separating plates C1 to C15 with which it constitutes a possibly movable unit called the "electrode unit" 35. The separating plates P1 to P15 are thus fixed to each other, and held with a spacing between them which corresponds to the pitch p with which the cells C1 to C14 are arranged.

The movement of the electrode unit 35 is symbolised by an arrow 29; it must occur over a distance d2 which is that necessary to transport the separating plates P1 to P15 from the storage position (represented in the box 25) as far as the activated position where they are in the cells, as shown in the box 26.

In this movement, the electrode unit 35 may slide for example along a spindle 44 arranged along the longitudinal axis 5. The electrode unit 35 may be guided in various ways, it may be guided for example with the aid of a rib 70 on the spindle 44.

The movement of the electrode unit 35 from the storage position as far as the activated position may be accomplished using various means which are known per se, in particular as a function of the application of the battery 1.

For example, if the battery 1 is used with an artillery shell which has very high acceleration, the electrode unit 35 may behave as an inertia block whose inertia, at the instant of starting of the shell, causes the movement and consequently the driving in of the electrodes into the cells C1 to C14. It should, however, be noted that the force which causes the movement of the electrode unit 35 should be substituted for when it stops, in order to hold the separating plates P1 to P15 driven in between the cells C1 to C14.

It is also possible to produce the movement of the electrode unit 35 with the aid of a conventional activation device 40 using the pressure of a gas coming from a gas generator 41. The electrode unit 35 acts as a piston and slides on the central spindle 44 so as to be mobile along the longitudinal axis 5, between two positions PS and PA: the first position PS is that which is nearest an upper wall 38 of the enclosure 2, and it constitutes the storage position, the second position PA being the activated position. The electrode unit 35 is held at the storage position PS by conventional means (not represented).

The generator 41 is, in the example, located in a space 43 formed between the electrode unit 35 and the upper wall of the enclosure 2. When it is time for the battery 1 to be activated, a gas released by the generator 41 pushes the electrode unit 35 like a piston, and causes the electrodes E−, E+ to be driven into the cells C1 to C14. The gas generator 41 may be controlled conventionally, generally by an electrical pulse.

With a view to holding the electrode unit 35 in the activation position after it is placed in position by the gas generator 41 (or by the starting acceleration of the shot), the spindle 44 is equipped with a non-return device. Various means are known for this purpose. In the non-limiting example described, this is accomplished with the aid of a spring plate 71, which, during storage, is retracted in the spindle 44 itself; when the electrode unit 35 is driven in, the spring 71 escapes and thus prevents a return motion of the electrode unit 35.

With an appropriate sensor, an activating device 40 makes it possible to activate the battery 1 in a large number of situations and applications: control by electrical pulse, percussion or other means.

It should be noted that an electrochemical battery according to the invention is of very particular interest in the case of mortar rounds, because the placement of the electrolyte in the electrolyte cells and the balancing of this electrolyte in the cells does not require the presence of a centrifugal force.

In the non-limiting example in FIG. 2, the outputs "+" and "−" of the electromotive force of the battery 1 (that is to say coming from the setting of all the cells C1 to C14 in series) are symbolically represented as being available at first ends 60 of two connection wires F1, F2; these outputs "+"and "−" being stationary. The two wires F1, F2 are connected at their second ends 61 to the plates P1 and P15 respectively, the electrical contacts being obtained for example by welding.

If the electrodes are mobile, that is to say if the separating plates P1 to P15 are driven in between the cells C1 to C14 as a result of a movement of these separating plates as previously explained, it is necessary to connect the first and last plate P1, P15 to the stationary connections of the battery, for example by a flexible wire; the wires F1, F2 then have a sufficient range of movement to take up the movement of the electrodes. Obviously, a spring-plate connection (not represented), which is per se conventional, may also be used, as described for example in U.S. Pat. No. 4,331,848.

In the converse case, when the electrodes are stationary, the output connections are produced conventionally and simply on the electrodes themselves.

We claim:
1. An electrochemical battery having:
   a group of mobile electrode carrying plates, said plates having electrodes affixed thereon; and
   a fixed electrolyte container having electrolyte therein, said electrolyte extending throughout said container in an uncompartmented manner when said battery is in a storage state where said electrodes are out of contact with said electrolyte, and said electrolyte being compartmented into several individual portions, the individual portions isolated from each other by said electrode carrying plates when said battery is in an activated state, the electrodes in contact with said electrolyte in the activated state.

2. An electrochemical battery according to claim 1, wherein said electrode carrying plates are translationally movable towards said container.

3. An electrochemical battery according to any of claims 1 or 2, wherein the electrolyte is a gel.

4. An electrochemical battery according to any one of claims 1 or 2, wherein said electrode carrying plates each comprise two main faces, one of said faces carries an electrode of one given polarity and the other face carries an electrode of an opposite polarity.

5. An electrochemical battery having a storage state in which the battery is inactive and an activated state in which the battery is active, said battery comprising several electrode carrying plates, each plate having two main faces, one of said faces carries an electrode of one given polarity and the other face carries an electrode of an opposite polarity, said battery further comprising an electrolyte container having electrolyte therein, means for maintaining the electrode carrying plates out of contact with the electrolyte when said battery is in the storage state, means for allowing displacement of said electrode carrying plates towards and into said container during an activation operation, and means for maintaining the plates in said container, when the battery is in the activated state, in a position such that a respective pair of adjacent plates enclose a respective portion of said electrolyte, said portion isolated from other portions by said pair of adjacent plates.

6. An electrochemical battery according to claim 5, wherein said electrolyte is a gel.

* * * * *